United States Patent [19]

Nogle

[11] Patent Number: 4,586,401
[45] Date of Patent: May 6, 1986

[54] TRANSMISSION SPEED SENSOR ARRANGEMENT

[75] Inventor: Thomas D. Nogle, Troy, Mich.

[73] Assignee: Chrysler Corporation, Highland Park, Mich.

[21] Appl. No.: 600,637

[22] Filed: Apr. 16, 1984

[51] Int. Cl.$^4$ .............. F16H 3/74; F16H 37/08; G01P 3/48; F16C 3/00

[52] U.S. Cl. .............. 74/752 A; 74/752 R; 74/330; 74/731; 74/695; 324/174; 403/354; 464/182

[58] Field of Search ............ 74/752 D, 752 A, 752 R, 74/752 C, 330, 336 R, 336 B, 336.5, 866, 731, 695; 324/173, 174, 166; 464/182, 52; 403/345, 348, 354, 361

[56] References Cited

U.S. PATENT DOCUMENTS

| | | | |
|---|---|---|---|
| 2,781,649 | 2/1957 | Stahl et al. | 464/182 |
| 3,667,322 | 6/1972 | Noguchi et al. | 74/752 A |
| 3,700,079 | 10/1972 | Shirai et al. | 74/752 A |
| 3,845,671 | 11/1974 | Sharp et al. | 74/710.5 |
| 4,095,487 | 6/1978 | Cartwright et al. | 74/763 X |
| 4,107,776 | 8/1978 | Beale | 74/752 D |
| 4,192,203 | 3/1980 | Dailey | 74/752 A |
| 4,485,443 | 11/1984 | Knodler et al. | 74/752 A |
| 4,506,563 | 3/1985 | Hiramatsu | 74/752 A |

Primary Examiner—William F. Pate, III
Assistant Examiner—Stephen B. Andrews
Attorney, Agent, or Firm—Edward P. Barthel

[57] ABSTRACT

A remote dual speed sensing arrangement for a motor vehicle automatic power transmission turbine input and output shafts aligned on a common axis. The output shaft has an axial throughbore aligned on the input shaft axis. A speed shaft is rotatably journalled in the throughbore and has one end coupled to the input shaft. The shaft opposite free end has a toothed speed wheel mounted thereon for rotation on the common axis adjacent the transmission output gear mounted on the free end of the output shaft. A pair of magnetic sensors are supported on the transmission housing in side-by-side radially offset relation. The sensors have their pickup ends juxtaposed to the periphery of the speed wheel-teeth and output shaft gearteeth, respectively. Thus, the speed of both the transmission's input and output shafts may be accurately sensed and measured from a single remote installation while obviating the generation of false speed signals between the sensors and their associated rotating teeth.

3 Claims, 9 Drawing Figures

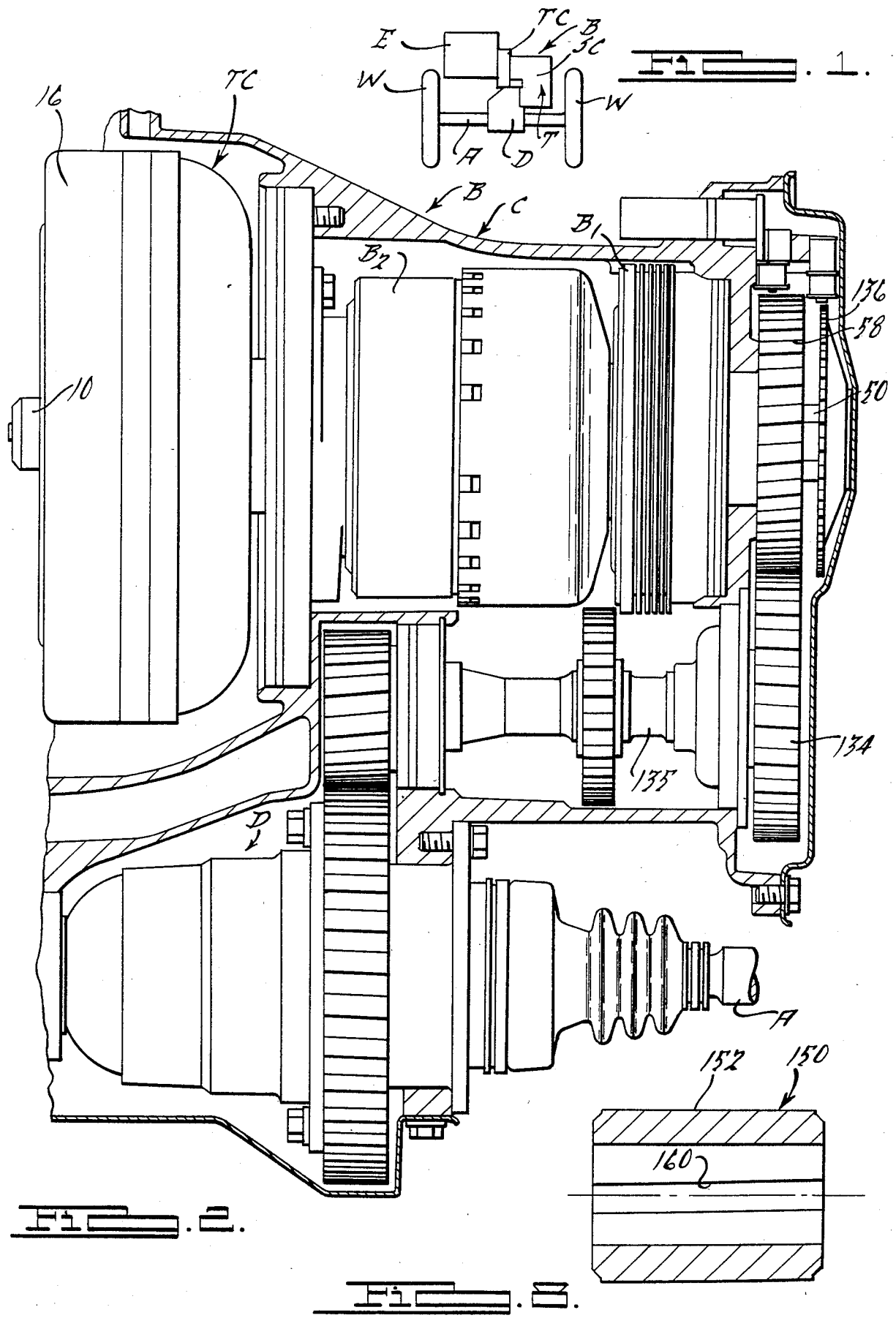

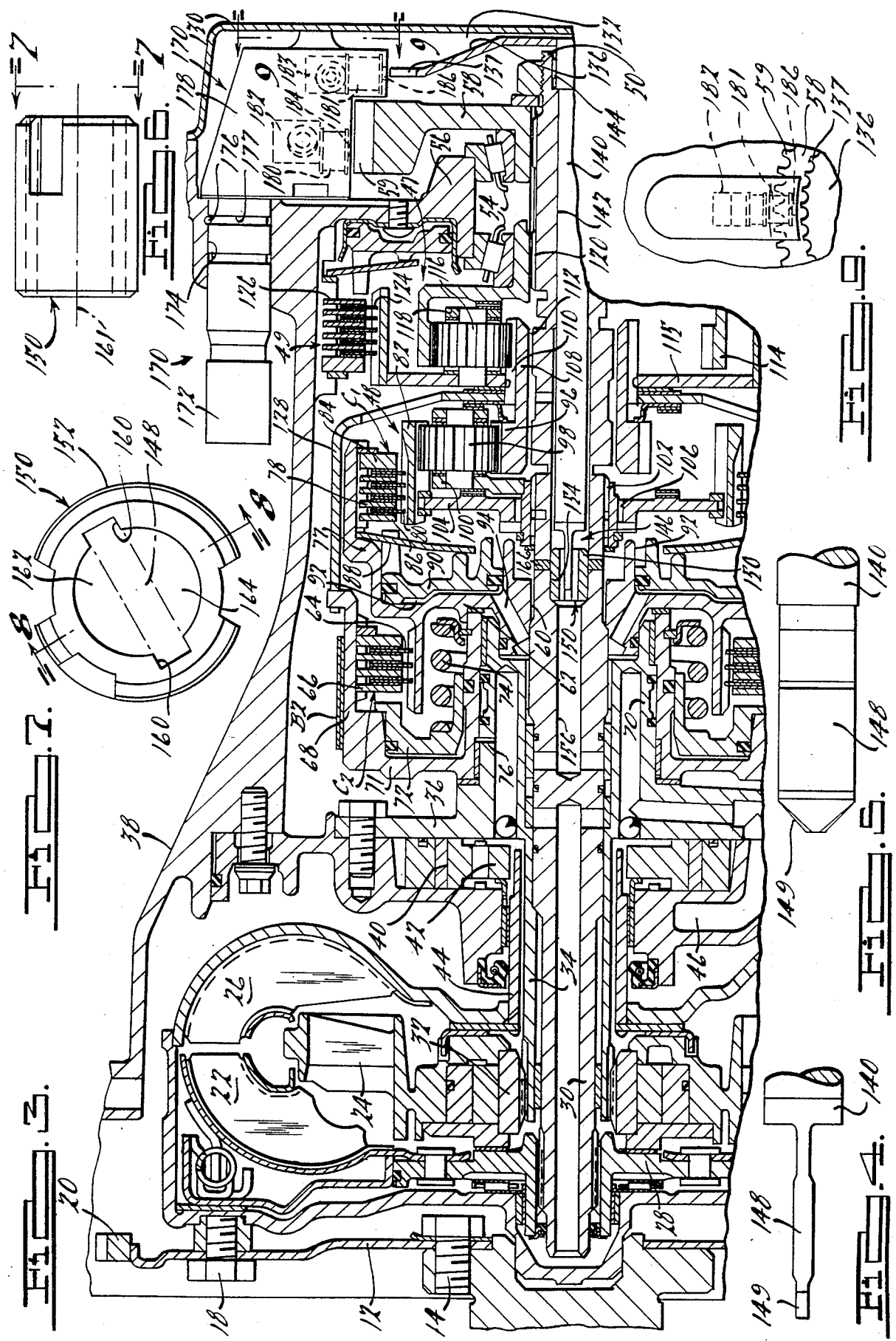

TRANSMISSION SPEED SENSOR ARRANGEMENT

BACKGROUND OF THE INVENTION

The invention relates to an automatic power transmission for motor vehicles, and more particularly to a speed sensing arrangement which permits remote dual speed measurement of the transmission input and the transmission output shaft from a single remote installation.

The U.S. Pat. No. 3,845,671 issued to Sharp et al and assigned to the same assignee as the present invention discloses a dual electro magnetic sensor unit for a four wheel drive transfer case. The Sharp et al sensor unit has first and second pickups positioned in the outside wall of a transfer case housing and is responsive to the rotation of two timing wheels for generating an electric signal. The signal is fed through a logic comparison network to control a locking means for placing the transfer case in either two or four wheel drive.

SUMMARY OF THE INVENTION

Briefly, the present invention provides a vehicle transmission having a speed shaft journalled within a transmission output shaft. The speed shaft axis is common to the axis of the output shaft adjacent its free end for rotation therewith. The speed shaft free end extends beyond the output shaft and has a speed wheel mounted on its free end. The input is splined to the hub of a torque converter turbine. The output shaft is supported in the rear wall of the transmission speed change section. Torque developed by the crankshaft is transmitted from the torque converter to the transmission speed change section output shaft both by planetary and compounded gear set means.

The aft end of the transmission input shaft and the forward end of the transmission output shaft are in spaced opposed relation. Coupling means, fixed to the input shaft, support the forward end of the speed shaft concentrically within the output shaft through bore. The coupling means has a passage therethrough allowing lubricating fluid to flow from the input shaft axial bore into the concentric space between the output shaft and the speed shaft for passage through radial bores in the output shaft.

A speed change section output gear is secured adjacent to the rearward end of the output shaft and transfers the drive from the speed change section to the transmission transfer section. The turbine speed wheel has a diameter a predetermined amount less than the diameter of the output gear respectively. The speed wheel has teeth formed on its periphery with spacing, size and shape appropriate for the effective triggering of the speed sensor device.

The speed change section rear wall is adapted to support an electrical pickup arrangement having dual sensors. Each of the side-by-side sensors is located in spaced proximity to the teeth of the transmission output gear and a speed wheel, respectively. The sensors are radially offset a predetermined distance equal to the dimetrical difference between the output gear and the speed wheel. Thus, the rotational speed of both the speed wheel and output gear are accurately obtained from dual remote sensors supported juxtaposed the teeth of their associated output gear and speed wheel.

IN THE DRAWINGS

FIG. 1 is a schematic front elevational view of a motor vehicle drive train which includes an automatic power transmission unit embodying this invention;

FIG. 2 is an elevational view of a power transmission unit constructed in accordance with this invention with the case thereof broken away and shown in section for clarity;

FIG. 3 is an enlarged sectional view of the upper portion of FIG. 2;

FIG. 4 is an enlarged fragmentary side plan view of the blade portion of the coupling means;

FIG. 5 is a top plan view similar to FIG. 4;

FIG. 6 is an enlarged side elevational view of the sleeve member of the coupling means;

FIG. 7 is a enlarged vertical sectional view taken on the line 7—7 of FIG. 6;

FIG. 8 is a longitudinal sectional view taken on the line 8—8 of FIG. 7; and

FIG. 9 is a fragmentary vertical sectional view taken substantially on the line 9—9 of FIG. 3.

DESCRIPTION OF THE PREFERRED EMBODIMENT

FIG. 1 of the drawings diametrically discloses a motor vehicle power plant and drive train as shown in the above mentioned U.S. Pat. No. 4,095,487 to Cartwright et al the disclosure of which is incorporated by reference herein. It comprises an internal combustion engine E mounted transversely on a vehicle between two wheels W, which wheels may be the front or rear wheels. The engine E is drivingly connected to a power transmission unit which includes a hydrokinetic torque converter device TC drivingly connected to a change-speed gearbox B having a speed change section SC and a transfer section T. The output from the gearbox B is connected to a differential unit D which is drivingly attached to axles A attached to the wheels W.

FIG. 2 discloses the flow of power through the transmission unit that comprises torque converter TC, box B and differential D in a series connected drive transmitting relationship. The end portion of a driving member, such as the crankshaft of the engine E of the motor vehicle is indicated at 10. The shaft is drivingly connected to a drive transmitting ring 12 (FIG. 3) by fasteners 14 and the ring is suitably connected to a torque converter casing 16 by bolts 18. An engine starter ring 20 is mounted on and extends around the periphery of the drive ring 2.

The torque converter casing 16 contains a conventional turbine 22 and stator reaction member 24, as well as an impeller 26, with the impeller being integrally connected to the casings 16 and the turbine member 22 being drivingly connected by a hub 28 to an input shaft 30. The stator 24 is connected by a one-way brake device, having an inner hub 32, to an axial sleeve 34 secured to a wall or partition 36 attached to the interior of a housing 38. The construction of a torque converter is well-known and reference may be had to the above mentioned Cartwright et al patent for a more detailed description of the transmission.

A hydraulic pump 40 has its driving element 42 connected to a rearwardly projecting end portion of torque converter casing flange portion 44. The pump 40 draws fluid from a supply sump (not shown) through a conduit 46 and circulates fluid through the converter TC, the transmission lubricating system, and the various hydraulically operated control mechanisms associated with this power transmission.

The gearbox B includes the forward drive clutch $C_1$, the direct drive clutch $C_2$, and a pair of planetary gear trains 47 and 48 which are adapted to cooperate with the torque converter device TC to provide means for the transmission of three forward drives and a reverse drive to a speed change section output shaft 50. The forward drive clutch $C_1$ is engaged whenever any of the three forward speeds are being used, and is disengaged when the transmission controls are set in either Neutral or Reverse. The direct drive clutch $C_2$ is engaged only when the third Direct Forward Speed is being transmitted and whenever Reverse drive is being transmitted.

The gearbox includes the housing 38, the speed-change section SC and the transfer section T. In the front portion of the speed change section are located the clutches $C_1$ and $C_2$ and one planetary gear set 48 whereas the rear portion of the speed change section houses the planetary gear set 47 and a suitable disc-type brake 49.

The rear end of the converter driven gearbox input shaft 30 is concentric with the forward end of the speed change section output shaft 50. Output shaft 50 is journalled in two bearings 54 located in the rear wall 56 of the speed change section. A speed change section output gear 58, having peripheral teeth 59, is secured adjacent to the rearward end of the output shaft 50 for transferring the drive from the speed change section SC to the transfer section T.

Transmission input shaft 30 is drivingly connected at 60 to a retainer element 62 which carries the friction clutch disc elements 64 of the Reverse and Direct Drive clutch $C_2$. The set of clutch discs 64 are adapted to be drivingly engaged with the use of clutch plates 66 which are drivingly connected to the interior surface of a drum 68. The drum 68 is journalled on the rearwardly projecting collar 70 on gearbox housing wall 36. A brake band B2 is arranged to be selectively applied to the drum 68 to prevent rotation thereof. The drum includes a backing plate 71 which cooperates with an axially shiftable piston 72 to effect drive transmitting engagement of the clutch discs 64 and 66. An annular spring 74 normally urges the piston 72 forwardly to clutch disengaged position. Pressure fluid for operation of the clutch $C_2$ is supplied to the piston bore for piston 72 through conduit 76 which is connected to the hydraulically operated control system.

The retainer 62 has a rearwardly extending clutch drum 77 at the periphery thereof. Clutch drum 77 has drivingly and shiftably mounted on its interior face one or more clutch plates 78. The clutch plates 78 are arranged to be drivingly engaged with the clutch discs 80 which are carried by the exterior surface of an annular gear 82 of the forwardly arranged planetary gear set 48. Clutch discs 78 and 80 are arranged to be drivingly compressed against a backing plate 84 by a pressure plate member 86 actuated by a lever spring plate 88. Lever spring plate 88 is operated by a piston 90 which reciprocates in a cylinder bore 92 formed in the rearside of the retainer 62. Pressure fluid is supplied to the cylinder bore 92 through a conduit 94 connected to the hydraulically operated control system.

Arranged concentrically within the forward drive clutch $C_1$ is the forwardly located planetary gear set 48. This gear set comprises the annulus gear 82, a sun gear 96, a planet pinion gear 98 connecting gears 82 and 96, and a planet pinion gear carrier 100 which rotatably supports the pinion gearing. Carrier 100 is splined to the speed change output shaft 50 at 102. Annulus gear 82 is supported on an annular plate 104 rotatably mounted by bushing 106 as the hub portion of the carrier 100. The sun gear 96 is an integral part of a double sun gear sleeve 108, with the sun gear 96 being formed on the front end and a sun gear 110 of the planetary gear set 47 being formed on the rear end thereof. Bearings 112 mount the sun gear sleeve 108 in the output shaft 50.

The rearwardly located gear set 47 includes the sun gear 110 and annulus gear 114, planet pinion gearing 116 which connects gears 110 and 114 and a planet pinion gear carrier 118 which rotatably supports pinion gearing 116. Annulus gear 114 is drivingly connected to the speed change section output shaft 50 by splines 120. Pinion gear carrier 118 is drivingly connected at 115 to the disc-like brake 49 having padded brake discs 124 adapted to be engaged by brake disc plates 126.

Interconnection between the two axially spaced adjacent gear sets 47 and 48 is achieved by the common sun gear sleeve 108 and by the dual connections of the front carrier 100 and the rear annulus gear 114 to the common speed change section output shaft 50. The drum 68 is connected by the bell-shaped member 128 to the sun gear sleeve 108.

An end cover plate 130 forms a chamber 132 at the end of the housing 38 opposite to the end in which the torque converter is located. Gear 58 on the end of the speed change section output shaft 50 drives a transfer gear 134 mounted on the end of a transfer shaft 135 (FIG. 2) located in the transfer section T of the housing 38 as shown and described in the U.S. Pat. No. 4,095,487.

A speed wheel 136 having peripheral teeth 137, is mounted on the free end of a speed shaft 140. The speed shaft is concentrically positioned in axial bore 142 of the output shaft 50 for rotation relative thereto. The speed shaft 140 is supported at its righthand or aft end by bearing 144 while its lefthand or forward end is attached by coupling means 146 to the aft end of the input shaft 30. In the preferred embodiment the coupling means comprises a flattened blade-like portion 148 formed on the forward end of the speed shaft 140 having chamfered lead-in edges 149 as shown in FIGS. 4 and 5.

FIG. 6 shows an enlarged detail view of coupling means sleeve member 150. The sleeve member 150 has an outer cylindrical portion 152 sized for press-fit retention in an axial counterbore 154 (FIG. 3) formed in the aft end of input shaft axial passage 156. The sleeve member 150, as seen in FIGS. 7 and 8, is formed with opposed internal longitudinal keyways or slots 160 shaped for the reception of the blade-like portion 148 when the speed shaft 140 is received in its axial bore 142. The slots 160 are formed with a shallow helix angle relative to the centerline 161 of sleeve member 150. This helix angle causes a slight twist to be imparted in blade 148 when it is inserted into the grooves 160. The resultant twist-fit eliminates any backlash condition at the coupling means. It will be appreciated that the sleeve member 150 extends, with diametrical clearance, into the ouput shaft bore 142.

The blade-like portion 148, as shown in dashed lines in FIG. 7, divides the sleeve into a pair of passageways 162 and 164, allowing lubrication oil to flow from the input shaft bore 156 to the output shaft bore 142. A thrust bearing 166 encircles the sleeve and abuts against the aft end face of the transmission input shaft 30. The bearing provides a load bearing surface rotating relative to the output shaft 50.

A dual electro magnetic remote sensor unit 170 is provided to sense the rotational speed of both the speed wheel 136 and the output gear 58. The sensor unit 170 may be of the general type shown and described in the Sharp et al patent cited earlier. However, it is to be understood that the present invention is not limited to any particular type of magnetic sensor. Various kinds of magnetic sensors such as passive, active or Hall-type sensors, for example, are contemplated for use in applicant's invention.

The sensor unit has a terminal cylindrical body 172, formed of suitable plastic insulator material, extending through a housing aperture 174 and is sealed therein by O-rings 176 seated in annular grooves in the body. The terminal body 172 has an insulative housing 178 which supports a pair of side-by-side induction sensing coils, shown in phantom at 180, 181. The coils 180 and 181, together with their associated permanent magnets 182 and 183, are encapsulated within the unit 170. The coil 180 has an iron core with its pickup end 184 juxtaposed the rotating peripheral teeth 59 of the output gear 58 for sensing the rotational speed thereof. The coil 181 has an iron core with its pickup end 186 juxtaposed the peripheral rotating teeth 137 of the speed wheel 136. Each of the radially offset pickup ends 184 and 186 are responsive to the rotation of their associated output gear and speed wheel, respectively. The sensing coils generate an electrical signal to a suitable electronic circuit (not shown) for controlling the operation of vehicle components such as the shifting of the transmission.

The pickup ends 184, 186 of the magnetic coils 180 and 181 are radially offset because the speed wheel 136 has a diameter a predetermined dimension less than the diameter of said output gear 58. That is, the pickup end 184 is located a predetermined radial dimension outwardly from the output shaft axis greater than the radial dimension of pickup end 186.

Tests have proven that the defined radial offset of the pickup ends 184, 186 substantially reduces interference or "cross-talk" between the electrical signals generated by the sensing coils 180 and 181. This important feature of the invention achieves a compact arrangement by preventing either sensing element from generating false speed signals. That is, the sensing head 184 will not pick-up false signals from the speed wheel teeth 137 and the sensing head 186 will not pick-up false signals from the output gear teeth 59. Incorrect signals are a major concern in any vehicle electronic control system which can affect vehicle performance.

Obviously, many modifications and variations of the present invention are possible in light of the above teaching. It is therefore to be understood, that within the scope of the appended claims, the invention may be practiced otherwise than as specifically described.

What is claimed is:

1. In an engine driven vehicle having an engine extending transversely with respect to the vehicle at one end thereof, a pair of wheels at the same end of said vehicle, and automatic drive transmission means connecting said engine to said wheels, said automatic drive transmission means including a housing attached to said vehicle, said housing having a torque converter section, a speed change section adjacent said torque converter section, and a differential and transfer section; said engine having a crankshaft, a torque converter in said torque converter section of said housing rotatable on the same axis as said crankshaft and adapted to be driven by said engine crankshaft, said torque converter drivingly connected to one outer end of a transmission input shaft, said input shaft having its other inner end located about mid-way through said speed change section, a speed change section output shaft mounted coaxial with said input shaft in said speed change section with its inner end adjacent said input shaft inner end and its outer free end extending beyond said speed change section, an output gear having peripheral teeth formed thereon, said output gear connected on said output shaft outer free end such that said output shaft and said output gear rotate on said input shaft axis, a transfer shaft having a transfer gear engaged with said output gear, said output shaft having a bore extending axially therethrough, the improvement wherein; a speed sensor shaft having a speed sensor wheel with peripheral teeth formed thereon fixed on the free outer end thereof, means journally supporting said speed shaft concentrically within said output shaft bore such that said speed wheel is axially spaced closely adjacent to said output gear, coupling means connecting said speed shaft inner end with the adjacent inner end of said input shaft such that said speed shaft rotates in unison with said input shaft, said speed wheel being positioned a predetermined axially distance beyond said output shaft free end, a pair of electrical pickup speed wheel and output gear sensors encapsulated within a single electromagentic remote sensing unit supported within said housing, said speed wheel pickup sensor located juxtaposed said speed wheel teeth and said output gear sensor located juxtaposed said output gear teeth, each said speed wheel and output gear sensor operative for sensing the angular position of its associated speed wheel teeth and output gear teeth, said speed wheel sensor being displaced axially from said input shaft inner end a distance substantially equal to the axial length of said output shaft; whereby the pulsed electrical signals generated by said speed wheel sensor and output gear sensor having frequencies proportional to the rotational speed of their associated speed wheel and output gear, respectively; such that the rotational speed of both said speed wheel and said output gear and thus their respective transmission input and output shafts rotational speeds are obtained from said pair of sensors located with said single remote unit, said speed wheel having a diameter a predetermined offset distance less than the diameter of said output gear, and wherein said speed wheel sensor is radially offset inwardly from said output gear sensor a distance substantially equal to said offset distance such that said speed wheel sensor does not receive false speed signals from said speed wheel teeth and said output gear sensor does not receive false speed signals from said output gear teeth.

2. The invention as set forth in claim 1, wherein said coupling means in the form of a blade-like portion including parallel side edges formed on the inner end of said speed shaft, a sleeve member fixed on the inner end of said input shaft, said sleeve member having a pair of opposed longitudinal slots fixedly receiving said side edges, respectively, of said blade-like portion therein, such that lubricating oil is free to flow from said input shaft bore into said output shaft bore via a pair of passageways defined by said blade-like portion and said sleeve member.

3. The invention as set forth in claim 1, wherein said pair of opposed longitudinal slots are formed along a shallow helix angle relative to the principal centerline of said sleeve such that a slight twist is imparted to said blade-like portion when it is inserted into said slots thereby fixedly retaining said blade in said slots obviating backlash of said speed shaft.

* * * * *